G. F. J. COLBURN.
Lamp Chimney.

No. 38,947.

Patented June 23, 1863.

Witnesses
James Sand
R. Gawley

Inventor
G. F. J. Colburn

United States Patent Office.

G. F. J. COLBURN, OF NEWARK, NEW JERSEY.

IMPROVEMENT IN GLASS CHIMNEYS FOR LAMPS.

Specification forming part of Letters Patent No. 38,947, dated June 23, 1863; antedated October 5, 1862.

*To all whom it may concern:*

Be it known that I, G. F. J. COLBURN, of Newark, in the county of Essex and State of New Jersey, have invented a new and useful Improvement in Glass Chimneys for Lamps; and I do hereby declare that the following is a full, clear, and exact description of the same, reference being had to the accompanying drawings, making a part of this specification, in which—

Figure 1:
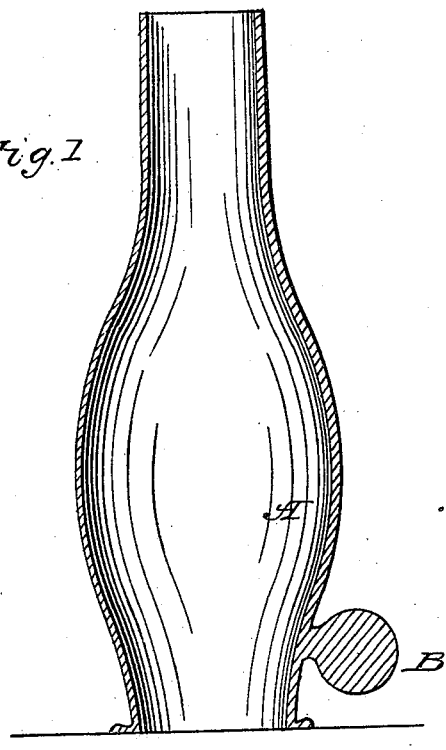
Figure 2:
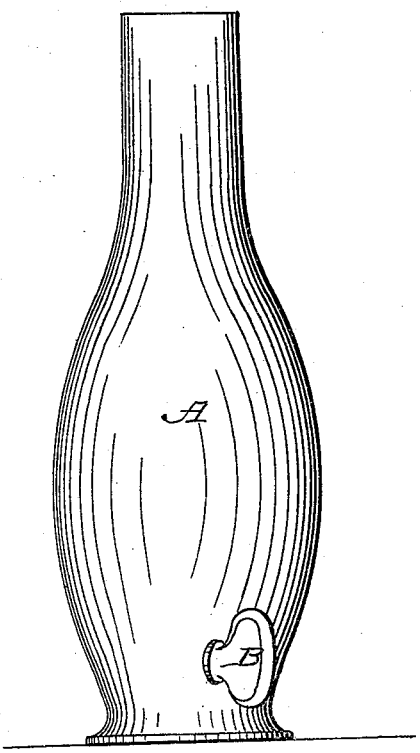
Figure 3:
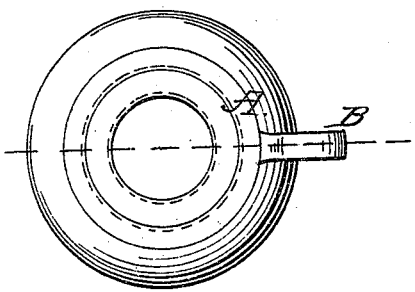

Figure 1 is a vertical central section of my invention; Fig. 2, a perspective view of the same; Fig. 3, a plan or top view of the same.

Similar letters of reference indicate corresponding parts in the several figures.

This invention consists in providing an ordinary glass lamp-chimney with a glass handle or projection, one or more, in such a manner that the chimney may be handled and removed from the lamp while in a heated state without burning the fingers.

Lamps which have a glass chimney for supplying the flame with a necessary amount of air to support combustion—such, for instance, as lamps designed for burning coal-oils—require the wicks to be very evenly trimmed in order to prevent smoking; and it is frequently the case that after the lamp is lighted and the chimney heated the latter has to be removed in order that the wick may be properly trimmed, and to effect this sufficient time must elapse after the extinguishing of the flame to allow the chimney to cool before it can be removed. My invention fully obviates this difficulty, as the handle or projection will never heat to such a degree that it cannot be grasped by the fingers and immediately removed from the lamp.

To enable those skilled in the art to fully understand and construct my invention, I will proceed to describe it.

A represents a glass lamp-chimney of the ordinary or any other form, and B is a handle or projection, which is of glass and permanently attached to the chimney at its lower part. This handle or projection may be molded with the chimney and both formed in one piece, or it may be made separately and afterward attached by fusion. The handle or projection may be of any proper form and placed at any point on the chimney, but the most desirable place would be near the base of the latter, as shown in Figs. 1 and 2, as the chimney does not heat intensely at that part. One or more handles or projections, B, may be used. If one only is employed it should project sufficiently far from the chimney to admit of being readily grasped by the fingers; but if two or more are used they may be shorter, as they could then be grasped at opposite sides of the chimney by the forefinger and thumb, the projections having such a position on the chimney as to admit of such manipulation.

The chimney can be manufactured with the handle or projection, one or more, at an inappreciable advance in cost.

Having thus described my invention, what I claim as new, and desire to secure by Letters Patent as an improved article of manufacture, is—

A glass lamp-chimney, A, with one or more glass handles or projections, B, substantially as described.

G. F. J. COLBURN.

Witnesses:
    R. GAWLEY,
    JAMES LAIRD.